US011879724B2

(12) United States Patent
Ragbeer

(10) Patent No.: US 11,879,724 B2
(45) Date of Patent: Jan. 23, 2024

(54) SPORTS FIELD MARKING ASSEMBLY AND METHOD OF MARKING A SURFACE

(71) Applicant: Ranji Ragbeer, Athens, GA (US)

(72) Inventor: Ranji Ragbeer, Athens, GA (US)

(*) Notice: Subject to any disclaimer, the term of this patent is extended or adjusted under 35 U.S.C. 154(b) by 0 days.

(21) Appl. No.: 17/793,310

(22) PCT Filed: Jan. 15, 2021

(86) PCT No.: PCT/US2021/013761
§ 371 (c)(1),
(2) Date: Jul. 15, 2022

(87) PCT Pub. No.: WO2021/146646
PCT Pub. Date: Jul. 22, 2021

(65) Prior Publication Data
US 2023/0133642 A1    May 4, 2023

Related U.S. Application Data

(60) Provisional application No. 62/961,681, filed on Jan. 15, 2020.

(51) Int. Cl.
*G01B 3/1089* (2020.01)
*G01B 3/1046* (2020.01)
(Continued)

(52) U.S. Cl.
CPC .......... *G01B 3/1089* (2020.01); *A63C 19/065* (2013.01); *G01B 3/1046* (2020.01);
(Continued)

(58) Field of Classification Search
CPC .. G01B 3/1089; G01B 3/1046; G01B 3/1071; G01B 3/1084; A63C 19/065;
(Continued)

(56) References Cited

U.S. PATENT DOCUMENTS 4,989,869 A * 2/1991 Lackey .................. A63B 57/10
                                                                 473/402
5,186,119 A * 2/1993 Hlavin ................. A63C 19/062
                                                                   33/1 G (Continued)

*Primary Examiner* — Melba Bumgarner
*Assistant Examiner* — Rayshun K Peng
(74) *Attorney, Agent, or Firm* — Mark C. Johnson; Johnson Dalal

(57) ABSTRACT

A sports field marking assembly and method of marking creates a boundary reference point and field lines on a field or for coaching. The assembly provides a marker anchoring device that is loaded with field markers. The marker anchoring device comprises a translatable handle coupled to a spring-loaded piston that discharge the field markers into the surface of the sports field. Bristles couple to a rear end of the marker body for visibility above the surface of the field. A tape canister couples to the marker anchoring device to dispense a measuring tape. The measuring tape couples to the field markers, serving to delineate the boundaries and lines on the field. Multiple aligners anchor into the sports field to retain the measuring tape in the formed patterns. The aligners have collapsible and moveable guide posts that can be selectively raised to guide the measuring tape though the chosen guide posts.

19 Claims, 15 Drawing Sheets

(51) Int. Cl.
*A63C 19/06* (2006.01)
*G01B 3/1056* (2020.01)
*G01B 3/1071* (2020.01)

(52) U.S. Cl.
CPC ......... *G01B 3/1056* (2013.01); *G01B 3/1071* (2013.01); *A63C 2019/067* (2013.01); *A63C 2203/18* (2013.01)

(58) Field of Classification Search
CPC ..... A63C 19/067; A63C 19/08; A63C 19/062; A63C 2203/18; E01C 23/163; G01C 15/004; A63B 69/002; A63B 69/00
USPC ......................................................... 473/490
See application file for complete search history.

(56) References Cited

U.S. PATENT DOCUMENTS

| | | | | |
|---|---|---|---|---|
| 5,501,170 | A * | 3/1996 | Walsh | G09F 17/00 |
| | | | | 116/173 |
| 6,053,260 | A * | 4/2000 | Boon | H02G 9/02 |
| | | | | 173/90 |
| 6,099,412 | A * | 8/2000 | Weibye | E01F 9/685 |
| | | | | 473/150 |
| 2006/0010705 | A1* | 1/2006 | Dettellis | G01B 3/11 |
| | | | | 33/756 |
| 2019/0366179 | A1 | 12/2019 | Holland | |

\* cited by examiner

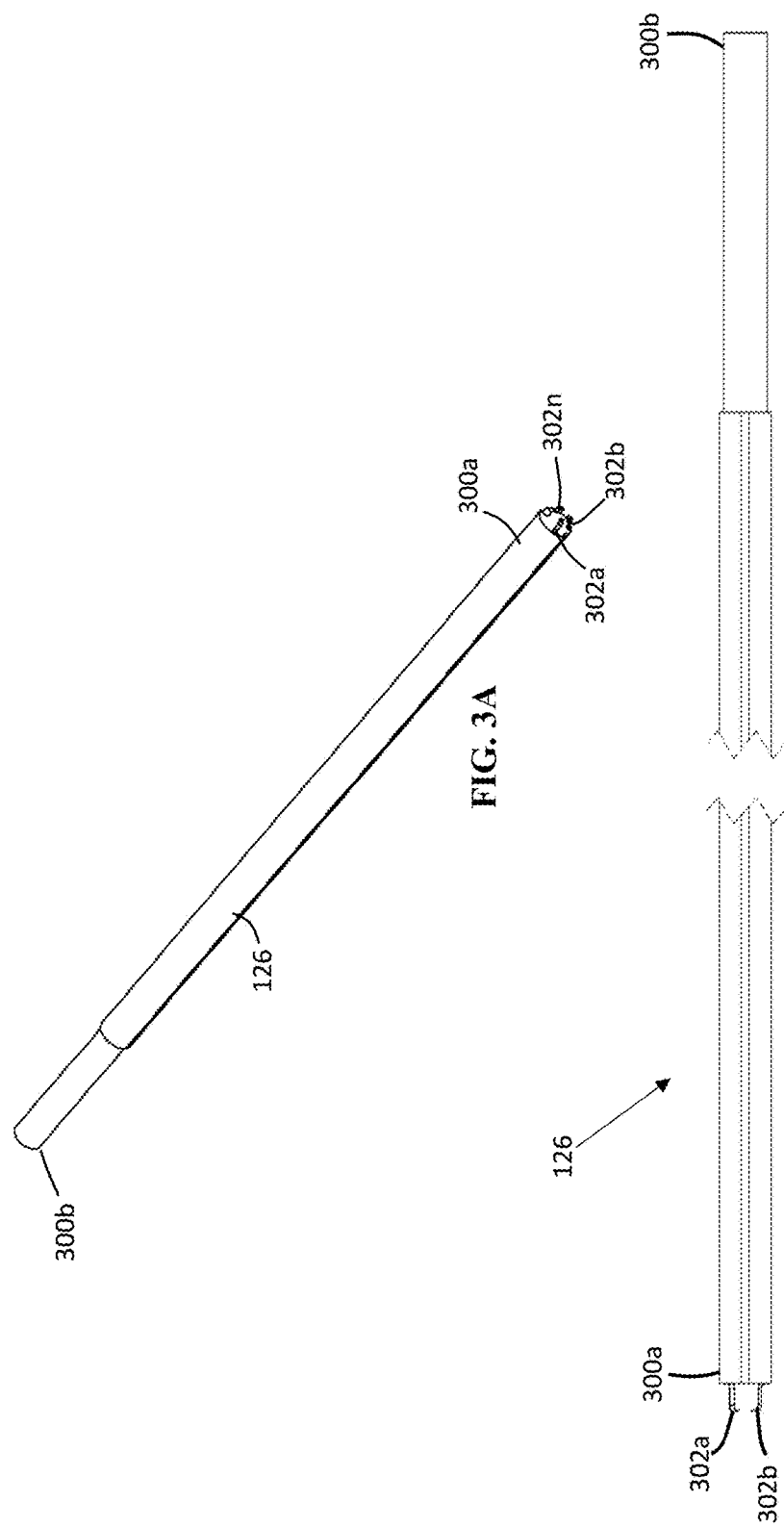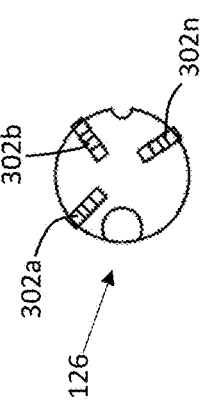

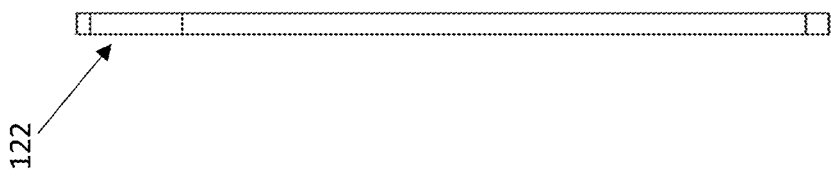
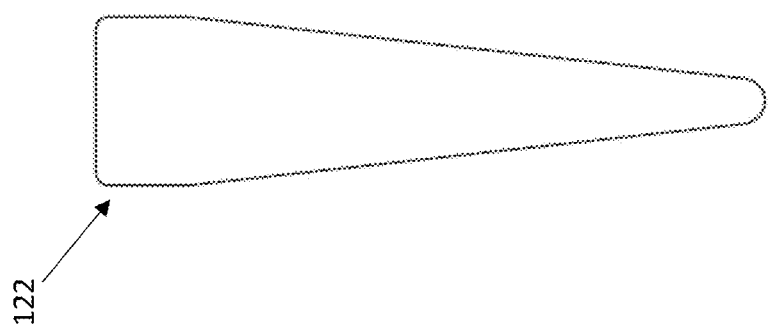
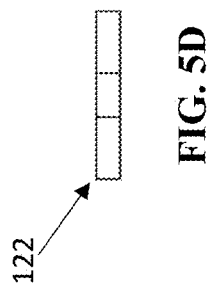
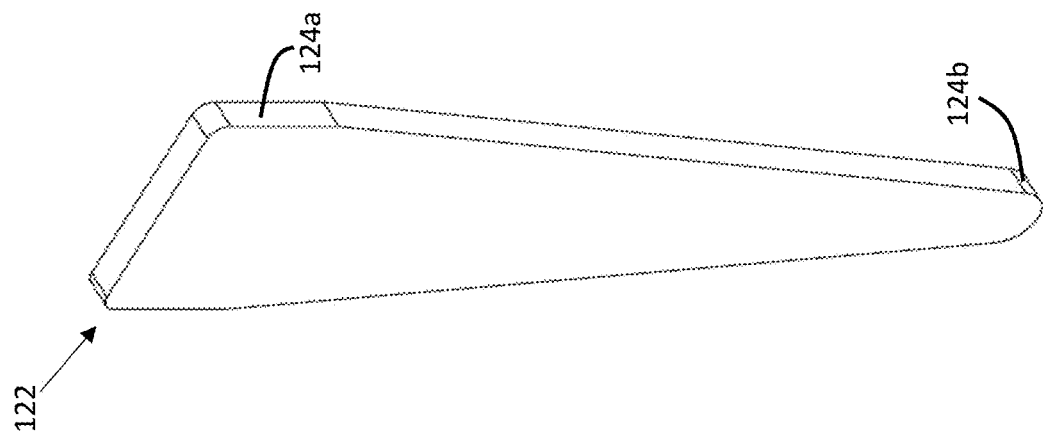

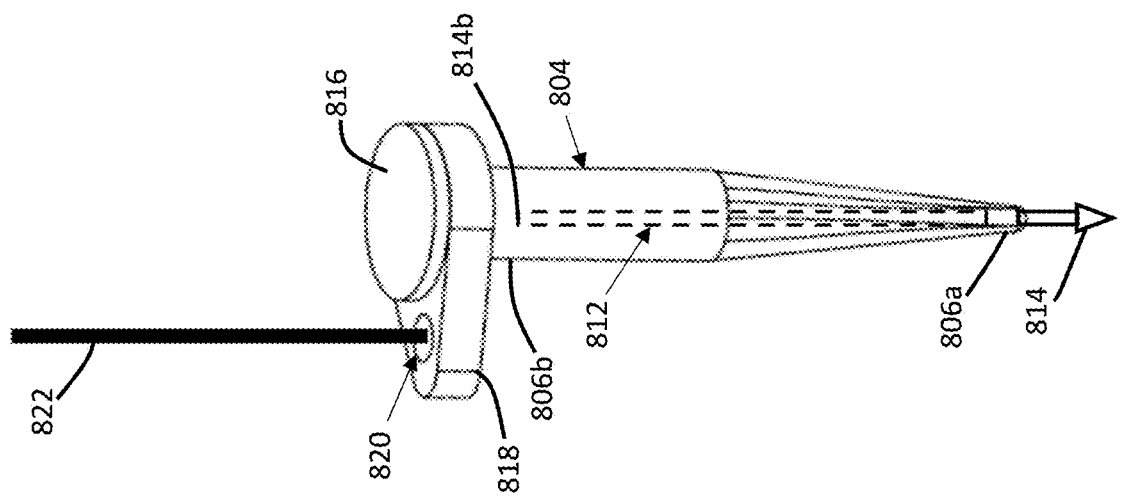
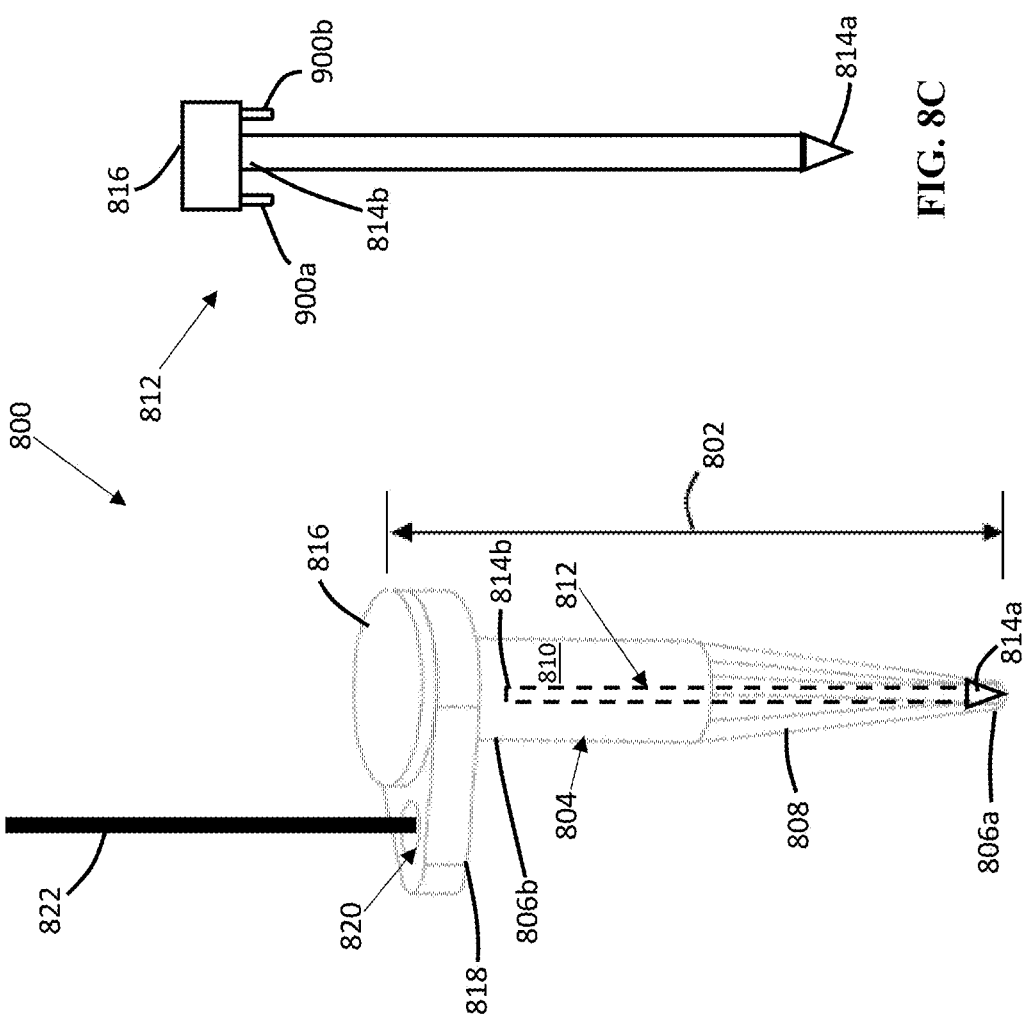
FIG. 8B
FIG. 8C
FIG. 8A

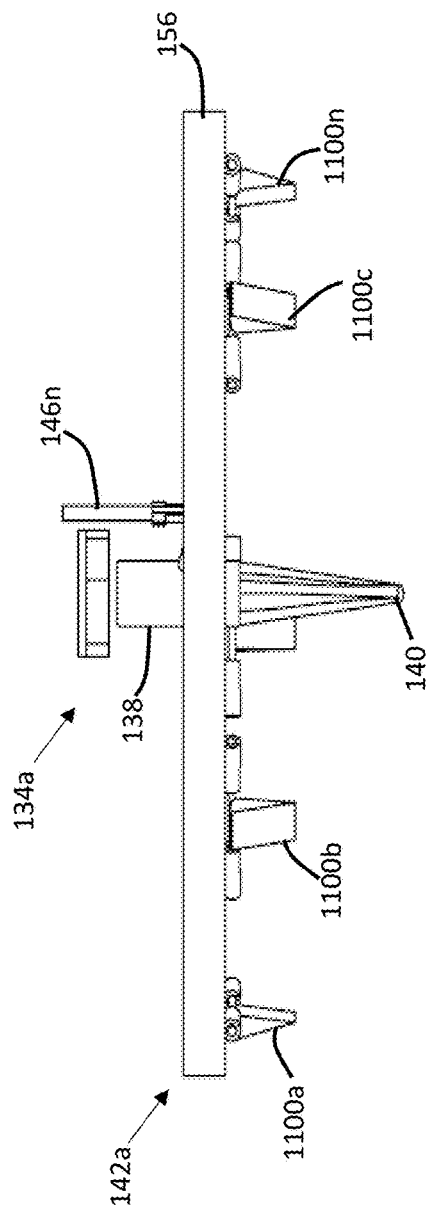
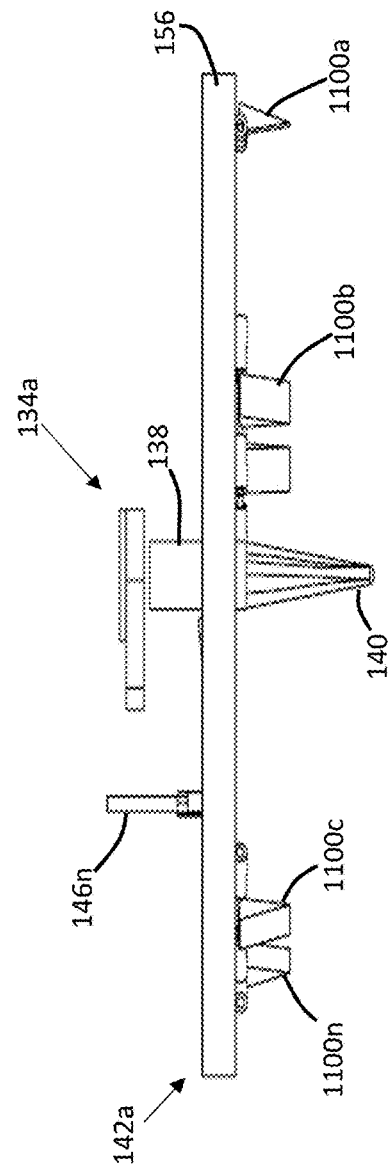

SPORTS FIELD MARKING ASSEMBLY AND METHOD OF MARKING A SURFACE

FIELD OF THE INVENTION

The present invention relates generally to a sports field marking assembly and method of marking a ground surface, and, more particularly, relates to a marking assembly that forms a desired boundary reference point, pattern, boundary, and/or field line in a variety of configurations as desired by the user.

BACKGROUND OF THE INVENTION

Typically, sporting events are played on a field or gymnasium that has markings to delineate boundaries, distances, and goals. These markings must have accurate field measurements to ensure fair game play. The integrity of the game requires that the field lines are drawn in accurate geometry and dimensions. Usually, a field maintenance crew installs the lines and boundary markers with pegs or posts and paint markings on the field. This can require a portable marking mechanism that is easily visible across a large field, and is accurate in measurements. Secondly, sports coaches use various sizes of plastic cones, flags, stakes, poles, low-profile hurdles, and other practice equipment to set visual cues, obstacles, and training aids for athletes to complete a particular exercise or drill.

The prior art teaches various systems for marking playing fields. However, such prior art lacks the ability to anchor multiple field markers into the ground with a spring-loaded injection body, and form a pattern, such as demarcation boundaries and field lines, with an attached measuring tape that is guided through one or more aligners positioned across the surface of the field in an effective or efficient manner. Similarly, prior art allows coaches to place cones as obstacles or as a training aid for athletes; however, these are not anchored to the turf, so they are easily disrupted, and are often an impediment to the exercise or drill because they constantly have to be reset, and often deflect balls (e.g. in a soccer passing or dribbling drill, in a baseball fielding drill, or in a field hockey exercise).

Therefore, a need exists to overcome the problems with the prior art as discussed above.

SUMMARY OF THE INVENTION

The invention provides a sports field marking assembly and method of marking a surface that is configured for efficiently and accurately creating a boundary reference point and field lines of the type commonly appearing on a sports field and for creating layouts that coaches use for sports drills and activities. The sports field marking assembly provides a marker anchoring device that is loaded with a plurality of field markers. The marker anchoring device comprises a translatable handle coupled to a spring-loaded piston that work together to forcibly discharge the field markers into the surface of the sports field. In this manner, the field markers are adapted to discharge from the marker anchoring device, and securely anchor into the sports field in an efficient manner. The field markers anchor in a desired pattern on the sports field, creating a boundary reference point and field lines, of the type commonly appearing on sports field or obstacles, visual cues, aids, or reference points for a particular coaching activity.

The field markers comprise a marker body defining a bullet-shape or similar design shape intended to easily penetrate grass field surfaces. The configuration of the insertion tip facilitates penetration through the surface of the sports field. A plurality of flexible bristles (or a solid but flexible flange) is coupled to a rear end of the marker body for visibility above the surface of the field. The bristles are visible above the surface of the sports field, when the field marker is anchored therein and are intended to return to their vertical position if stepped on, or if disturbed in any other way (e.g. by a ball, hockey stick, lacrosse stick, etc.).

The sports field marking assembly may also include a tape canister that couples to a specialized anchoring device (tab). The tape canister is configured to dispense a measuring tape, similar to those commonly used to mark sports fields. The measuring tape is configured to delineate the desired boundaries and lines on the sports field. The measuring tape is configured to couple to the tab directly or indirectly. The tab is intended to act as an anchor for the tape. In this manner, the tab, tape, and canister assembly allow field markers to be anchored into the surface of the playing field at desired distances from the tab as indicated on the tape which can extend between each field marker as these are inserted.

The sports field marking assembly may also include one or more aligners that are operably configured to anchor into the sports field in a desired arrangement, so as to allow a user to retain the measuring tape in various standard field-marking patterns, typical for sports fields or in a variety of configurations created by a sports coach or groundskeeping team. The bottom face of the aligners has collapsible spiked feet that penetrate into the surface of the sports field. The spiked feet are operably configured to hold and anchor the aligner at a desired position on the sports field. The top face of the aligners has a plurality of collapsible and moveable guide posts that can be selectively raised. The guide posts are configured to guide the measuring tape though the chosen guide posts.

In operation, a user anchors the aligner(s) as required on the sports field in a desired arrangement. The user then chooses which of the collapsible and moveable guide posts to raise, according to the field design that the user is attempting to accomplish. Once the user has raised at least one of the guide posts in an upright position, the tab (which is connected to the tape) is inserted in the center of the first aligner (as determined by the user) allowing the tape to then be extended towards the aligners. The rotating head of the tab allows the user to align tape with the center of the tab, aligner and any activated guide post in a straight line. If multiple aligners are used, angles can be created with the tape entering the aligner along one guide post, and exiting the aligner along another. In this manner, the user can efficiently and accurately create a boundary reference point and field lines, of the type commonly appearing on a sports field.

In one aspect, a sports field marking assembly, comprises a marker anchoring device comprising an injection body having a proximal end and a distal end defining a marker insertion aperture and a marker discharge opening thereon, the proximal end including a translatable handle defining a handle translation channel spanning from a portion of the injection body to the marker discharge opening, the handle having a piston disposed and operably configured to slidably translate within the handle translation channel.

The sports field marking assembly further comprises a plurality of field markers, each having a marker body defining an insertion tip and having a plurality of bristles coupled to the marker body, the marker body and the plurality of bristles operably configured to be inserted within the marker insertion aperture, the marker body and the plurality of bristles further being operably configured to be discharged through the marker discharge opening, whereby the field markers are operable to anchor into a surface, whereby the field markers form a pattern across the surface.

The sports field marking assembly further comprises a tape canister coupled to the injection body, the tape canister operable to dispense a measuring tape, the measuring tape being detachably coupled to the tab, whereby the measuring tape extends along a line where field markers can be inserted to form a desired pattern.

In accordance with a further feature of the present invention, the assembly further comprises one or more aligners operable with the, tab, tape, anchoring device, and field markers.

In accordance with a further feature of the present invention, the aligners define a bottom face having multiple collapsible spiked feet operably configured to hold and anchor the aligner at a desired position on the surface.

In accordance with a further feature of the present invention, the aligners define a top face having a plurality of collapsible and moveable guide posts operatively configured to be selectively lowered and raised, whereby the guide posts in the raised position guide the measuring tape in a desired direction. In accordance with a further feature of the present invention, the guide posts have a flexible top section and a rigid bottom section. The rigid bottom section is designed to allow the tape to be held in position until the user decides to move the tape to another guide post on that aligner. The flexible top section allows the tape to be moved across it, returning to its original vertical position if the tape passes across it.

In accordance with a further feature of the present invention, the assembly further comprises a magazine mount operably configured to guide the field markers into the marker insertion aperture. In accordance with a further feature of the present invention, the magazine mount detachably couples to the injection body.

In accordance with a further feature of the present invention, the magazine mount comprises a marker housing operably configured to hold the field markers, the marker housing having an upper end and a bottom end opposing the upper end, the upper end being removably coupled to the distal end of the injection body, and in alignment with the marker insertion aperture.

In accordance with a further feature of the present invention, the inner surface of the injection body comprises a plurality of retractable stabilizers.

In accordance with a further feature of the present invention, the surface comprises a sports field.

In accordance with a further feature of the present invention, the pattern comprises a boundary or reference point on a field for visual cue to users using the field. In accordance with a further feature of the present invention, the field markers comprise a retractable insertion body or may otherwise be removed by a user, having a bottom end and an upper end opposing the bottom end, the retractable insertion body further having a length, extending from the bottom end to the upper end.

In accordance with a further feature of the present invention, the bristles couple to the retractable insertion tip on the upper end. In accordance with a further feature of the present invention, the retractable insertion body comprises a fuselage, the fuselage encasing a pin having a length. In accordance with a further feature of the present invention, the pin comprises a dart having an upper end and a bottom pointed end, the dart being coupled to an end cap on the upper end.

In accordance with a further feature of the present invention, the end cap couples to a plurality of spring members operably configured to generate a spring force that forces the end cap up to the top of the upper end of the retractable insertion body, whereby the pin is retracted within the fuselage. In accordance with a further feature of the present invention, the measuring tape comprises an eye coupled to one of the ends, the eye being operably configured to attach to the tab.

In accordance with a further feature of the present invention, the tape canister defines an interior cavity sized to fit the measuring tape, the tape canister further defining an opening in fluid communication with the interior cavity. In some embodiments, an exemplary method of marking a field with a sports field marking assembly comprises an initial Step of inserting a one or more aligners into the surface. The method may also include a Step of inserting, with the marker anchoring device, the tab into the middle of the first aligner and into the surface.

Another Step comprises dispensing a measuring tape from a tape canister, the measuring tape is not coupled to the field markers. A Step includes inserting, with the marker anchoring device, one or more subsequent field markers into the surface, whereby the measuring tape extending between multiple aligners and field markers forms a pattern.

The method may further comprise a Step of selectively raising at least one guide posts on the aligners to an upright position.

In some embodiments, a Step comprises guiding the extended measuring tape through the raised guide posts, whereby the measuring tape extends along the pattern formed by the field markers.

A Step includes dispensing the measuring tape in alignment with the tab, and the alignment posts for one or more subsequently anchored field markers.

A final Step includes anchoring additional aligners and field markers until a desired boundary reference point and field line form or a desired pattern is established.

Although a specific order of marking a field with the sports field marking assembly has been described, the order of executing the steps may be changed relative to the order shown in certain embodiments. Also, two or more steps may be executed concurrently or with partial concurrence in some embodiments. Certain steps may also be omitted for the sake of brevity. In some embodiments, some or all of the process steps may be combined into a single process.

Although the invention is illustrated and described herein as embodied in a sports field marking assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 3A-3C are views of an exemplary piston, where FIG. 3A shows a perspective view, FIG. 3B shows an elevated side view, and FIG. 3C shows an end view, in accordance with one embodiment of the present invention;

FIGS. 5A-5D are view of an exemplary end cap for a magazine mount, where FIG. 5A shows a perspective view, FIG. 5B shows a frontal view, FIG. 5C shows a side view, and FIG. 5D shows an end view, in accordance with the present invention;

FIGS. 8A-8C are views of a field marker and pin with springs, where FIG. 8A shows a pin in a retracted position, FIG. 8B shows the pin in an extended position and FIG. 8C is side view of an exemplary pin with springs operational inside the fuselage of the field marker, in accordance with one embodiment of the present invention;

FIGS. 11A-11B are views of the aligner shown in FIG. 10, where FIG. 11A is a left-side view, and FIG. 11B is a right-side view, in accordance with the present invention;

Like reference numerals refer to like parts throughout the various views of the drawings.

DETAILED DESCRIPTION

Figure 1:
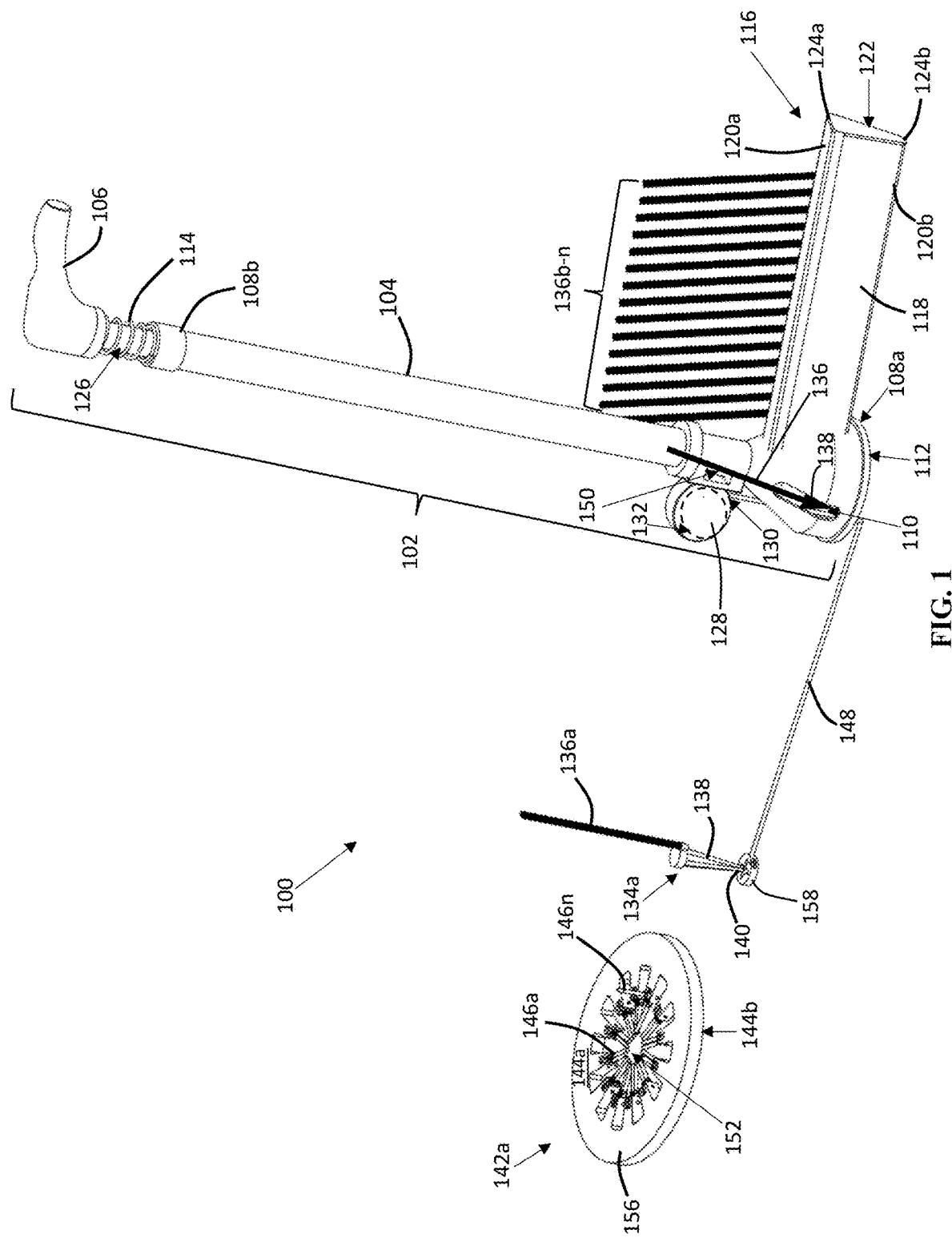
FIG. 1 is a perspective view of an exemplary playing field marking assembly, in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention described herein provides a sports field marking assembly and method of marking a field that overcomes known disadvantages of those known devices and methods of this general type and that facilitates the delineation and line marking across the surface of a sports field. Known embodiments of the present invention lack the ability to efficiently anchor field markers for coaching activities across the sports field, so as to form a boundary reference point, a field line thereon, or a visual cue, obstacle, or other desired coaching aid that does not detract from the activity, as is the case with sports cones.

The present invention overcomes these known disadvantages by anchoring the aligners across the surface of the sports field in a pattern, and then guiding the measuring tape that couples to the tab through the aligners to form a pattern. The user then selectively guides the measuring tape in the desired pattern to form a boundary reference point and a field line, as commonly delineated across a sports field or in a coaching activity.

Although the invention is illustrated and described herein as embodied as a sports field marking assembly, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

The attached figures are incorporated in and form part of the specification, and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

Figure 13:
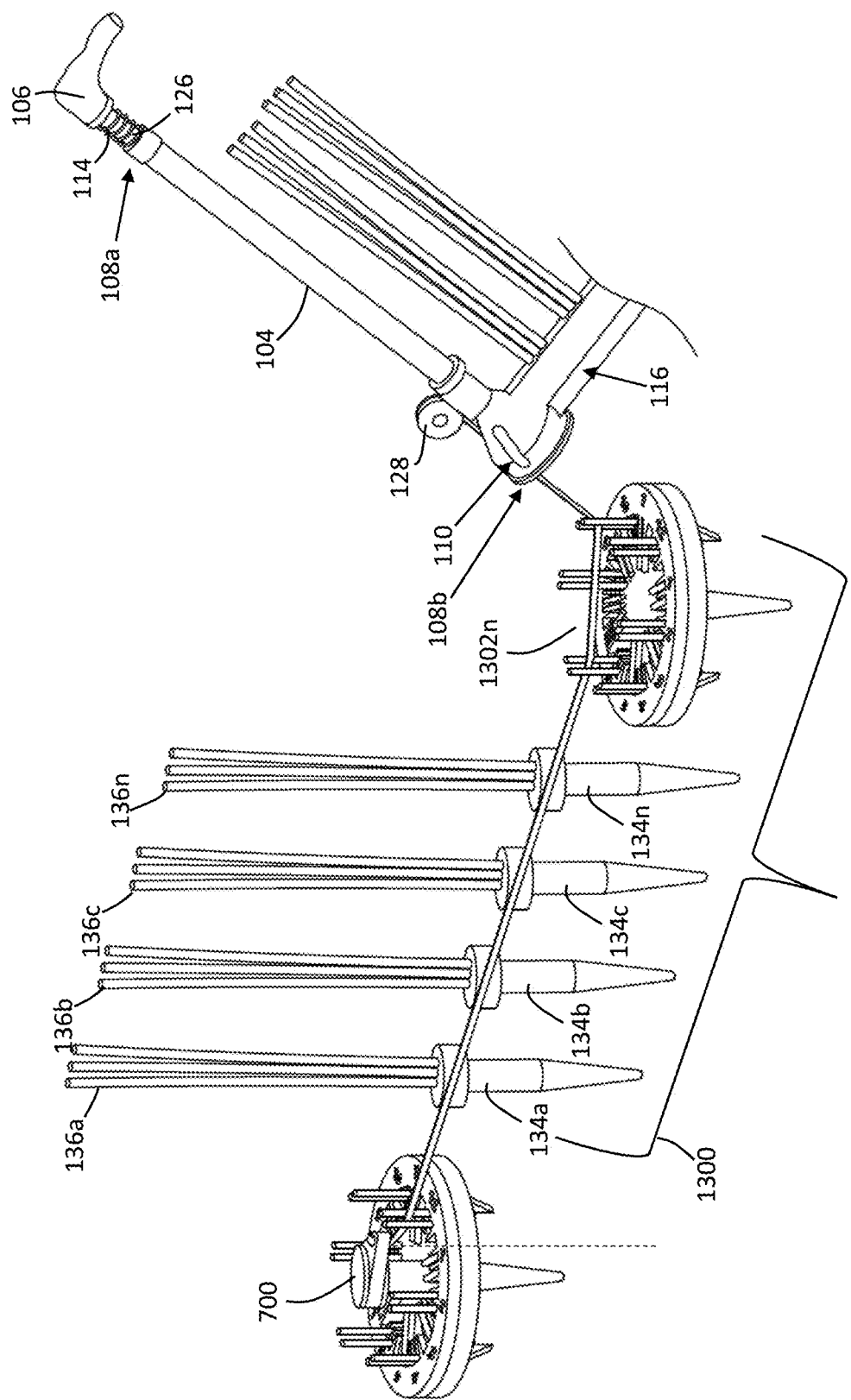
FIG. 13 is perspective view of the assembly in operation, showing the injection body anchoring the field markers into the surface, and the attached measuring tape forming a pattern, in accordance with the present invention.

The figures show several advantageous features of the present invention, but, as will be described below, the invention can be provided in several steps, sizes, combinations of features and components, and varying numbers and functions of the components. The invention consists of a sports field marking assembly and method 1500 of marking a field that achieves the goal of forming a boundary reference point and a field line across a sports field. This is accomplished through a portable marker anchoring device that anchors field markers in a desired pattern, and multiple aligners that are strategically positioned across the sports field, used to guide the measuring tape 148 and/or provide guidance on where the markers are to be anchored to form a desired pattern or reference point(s). Referring to FIG. 1 and FIG. 13, there may be multiple ways in which the tape attaches to an alignment marker 700 and/or tool 158.

Referring to FIG. 1, one embodiment of the present invention is shown in a perspective view. FIG. 1 and other figures show several advantageous features of the present invention, but, as will be described below, the invention can be provided in several shapes, sizes, combinations of features and components, and varying numbers and functions of the components.

The first example of a field marking assembly 100, hereafter "assembly 100" comprises a marker anchoring device 102 that serves as portable and handheld tool for anchoring a plurality of field markers 134a-n (wherein "n" represents any number greater than one) in a pattern, e.g., the pattern 1300 depicted in FIG. 13, that delineates or otherwise defines one or more boundary reference points and field lines across a surface 600, such as a sports field. The marker anchoring device 102 includes an injection body 104 that forms the housing for the components of the assembly 100.

Figure 2:
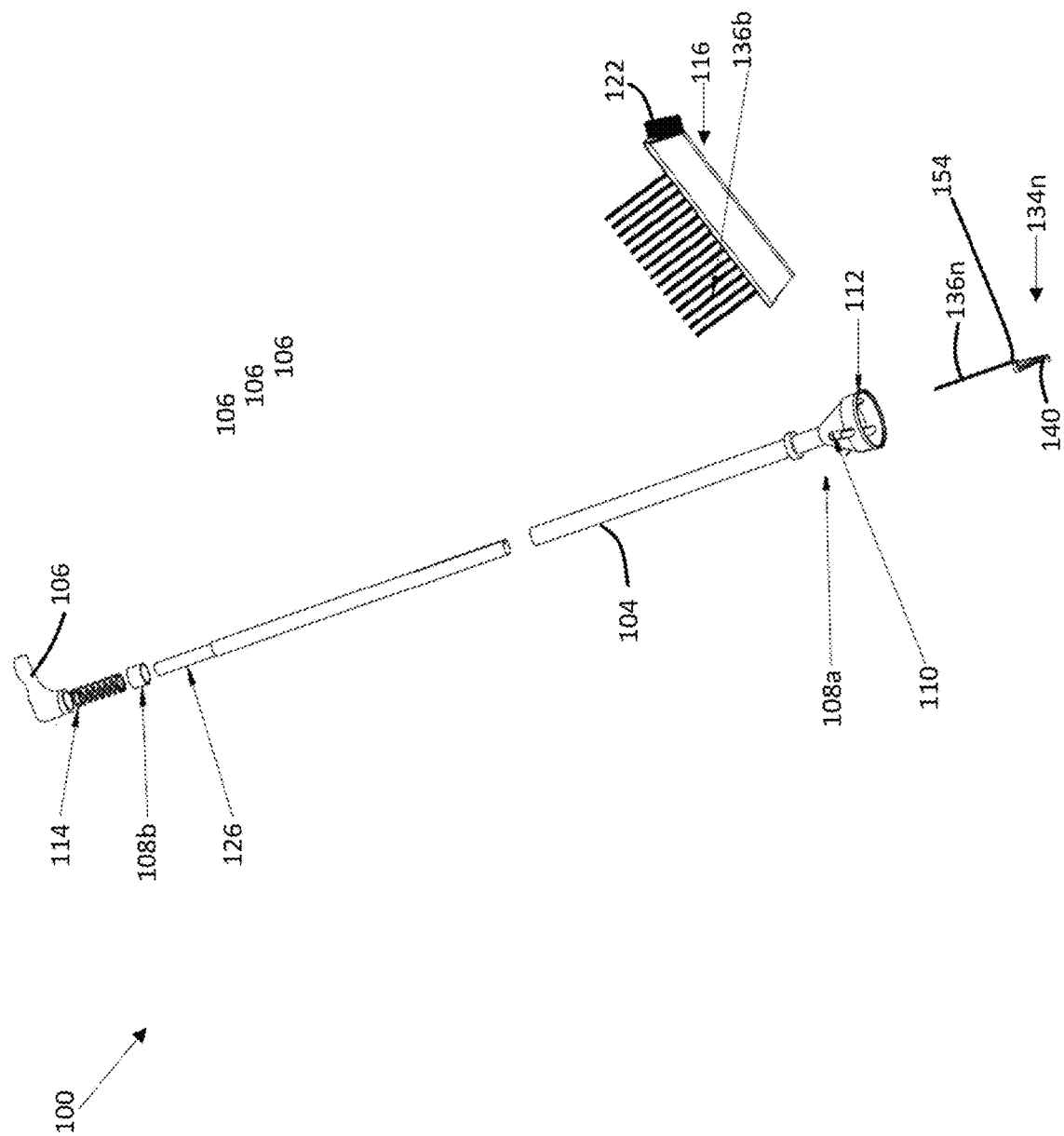
FIG. 2 is an exploded view of the playing field marking assembly shown in FIG. 1.

As illustrated in FIG. 2, the injection body 104 may be barrel or cylindrical shaped or another shape conducive, which as discussed below, facilitates translation of the handle 106. The injection body 104 of marker anchoring device 102 has a length, and in preferred embodiments, measures approximately 2-4 feet. The injection body 104 defines a distal end 108a and an opposing proximal end 108b. The distal end 108a is preferably oriented towards the surface 600, while the proximal end 108b orients towards the user.

In one embodiment, the distal end 108a is defined by a marker insertion aperture 110, that may be enclosed and sized and dimensioned to receive a plurality of field markers 134a-n (manually or through a mechanically biased slide system through a magazine 116. The distal end 108a defines a marker discharge opening 112 that is sized and dimensioned to enable discharge of the field markers 134a-n and/or the alignment field marker in a generally perpendicular relationship with the surface 600 when desired by the user. In some embodiments, the distal end 108a flares out to enable standing the injection body 104 in an upright position on the surface 600. However, in other embodiments, the distal end 108a has one or more outriggers operably configured to retract and extend to stabilize the injection body 104 when placed adjacent to the surface 600 for anchoring the field markers 134a-n.

Figure 9A:
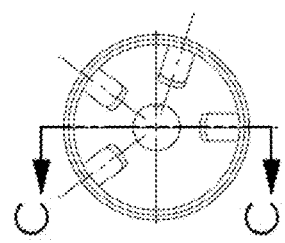
FIGS. 9A-9C depict views of an injection body used with the playing field marking assembly in accordance with one embodiment of the present invention.
Figure 9B:
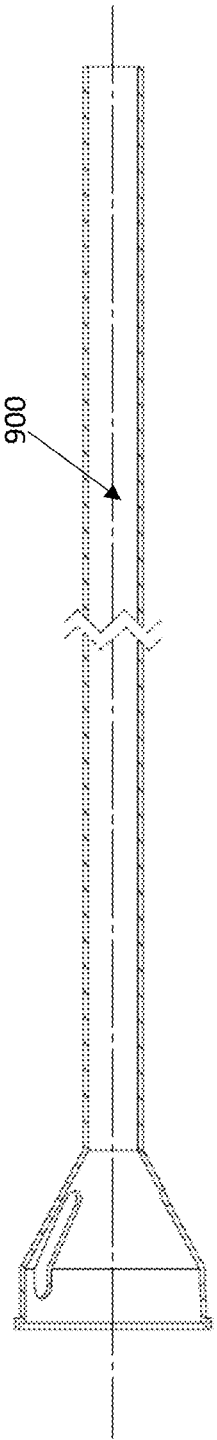
Figure 9C:
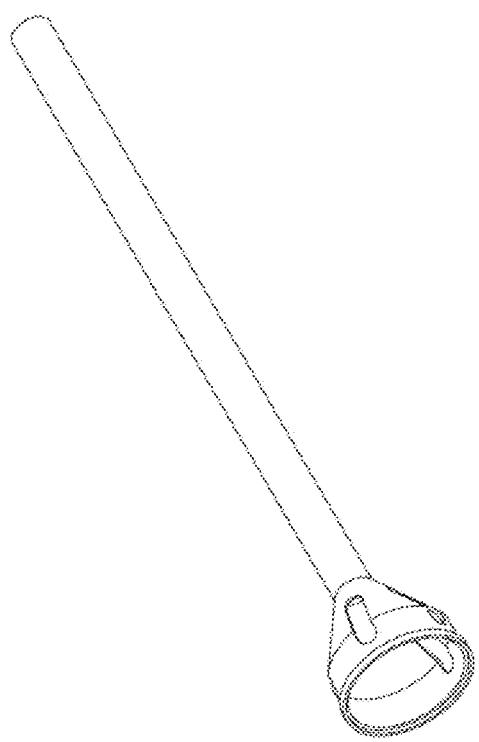

In some embodiments, the proximal end 108b of the marker anchoring device 102 includes a translatable handle 106 that couples to the injection body 104. In one non-limiting embodiment, the handle 106 extends substantially perpendicular from the proximal end 108b of the injection body 104. The handle 106 is operably configured to actuate discharge of field markers 134a-n at selected points across the surface 600 by depressing a piston 126 (using the weight or force generated by a user) to contact a head on the field markers 134 or alignment field marker 700. As shown in FIG. 1, FIG. 2 and FIG. 9, the handle 106 defines a handle translation channel 900 that spans from a portion of the injection body 104 to the marker discharge opening 112. In one non-limiting embodiment, the handle translation channel 900 may extend approximately three-quarters of the way to the terminus of the proximal, until the marker discharge opening 112 or preferably extends the entire length of the injection body 104.

FIG. 3A illustrates a piston 126 that is in mechanical communication with the handle 106. The piston 126 is disposed axially within the handle translation channel 900. From this axial position, the piston 126 is operable to slidably translate within the handle translation channel 900. In preferred embodiments, the translation of the piston 126 is linear, but may follow another path. As FIG. 3B shows, that the piston 126 has a handle end 300a, and an opposing marker end 300b. The handle end 300a may be in an articulating communication with the handle 106, such that translation of the handle 106 drives the piston 126. Multiple prongs 302a, 302b, 302n may be utilized help fasten or grip the piston 126 to the plurality of field markers 134a-n.

Figure 4:
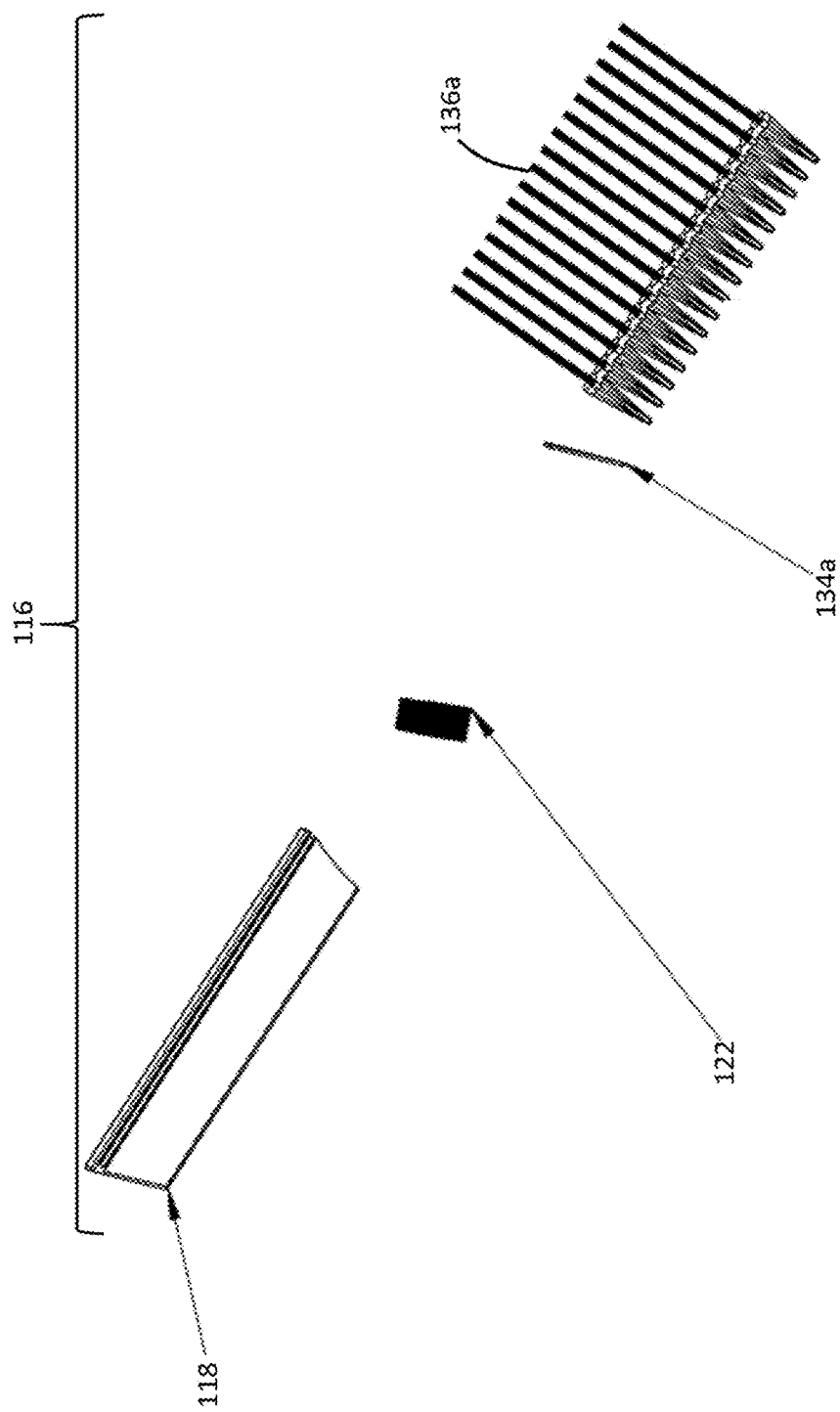
FIG. 4 is perspective view of an exemplary magazine mount, in accordance with one embodiment of the present invention.

In another embodiment, best shown in FIG. 4, the assembly 100 may beneficially include a removably coupled magazine mount 116 that is operable to guide the field markers 134a-n into the marker insertion aperture 110. In alternative embodiments, the magazine mount 116 may be permanently coupled to the injection body 104 and may be utilized to solely retain the field markers 134a-n before manual utilization by the user (e.g., for uploading on the injection body 104 before discharge through use of the piston 126). The magazine mount 116 may include a marker housing 118, operably configured to hold a plurality of markers or markers (not shown) (in a serial configuration) for injection into the surface 600. The marker housing 118 includes an upper end 120a and a bottom end 120b opposing the upper end 120a. The upper end 120a is removably coupled to the piston 126 through the magazine mount 116. Moreover, the magazine mount 116 includes a cap, coupled to the bottom end of the marker housing 118.

The magazine mount 116 may also include a spring member, disposed on the bottom end 120b of the marker housing 118 and proximal to a magazine end cap 122, discussed below. The spring member may be operably configured to generate a spring force which pushes the plurality of field markers 134a-n from the bottom end of the marker housing 118 to the piston 126. Said another way, once one of the field markers are expelled from the piston 126, the spring member forces another marker into the chamber created by the piston 126 to take its place. When a field marker 134 is placed in an insertion position along the translation path (as best shown in FIG. 1), the one or more flexible bristles 136 may extend through the insertion aperture 110 defined on the injection body 104. In an exemplary embodiment, a loaded magazine mount 116, filled with a plurality of field markers 134a-n, may be utilized. A spring member may be utilized and in a compact position to force field markers 134a-n toward a loading position with respect to the injection body 104. The flexible bristles 136a-n may be formed as a cylinder or other oblong shape that may be resilient material (e.g., silicon or natural rubber) and otherwise spring-back to a vertical position relatively to the head in order to serve as a perceivable visual cue for users on the field.

As illustrated in FIGS. 5A-5D, the magazine mount 116 comprises a magazine end cap 122, which serves to restrict the field markers 134a-n from disengaging from the magazine housing, until the field markers 134a-n enter the marker insertion aperture 110. In one non-limiting embodiment, the magazine end cap 122 has a flat shape with a tapered disposition that matches the profile of the magazine mount 116. This tapered configuration defines a wide end 124a and a narrow end 124b. As illustrated, FIG. 5A illustrates a perspective view of the magazine end cap 122; FIG. 5B illustrates a frontal view of the magazine end cap 122; FIG. 5C illustrates a side view of the magazine end cap 122; and FIG. 5D illustrates an end view of the magazine end cap 122. However, it is significant to note that the magazine end cap 122 can be shaped to accommodate differently sized and dimensioned magazine mounts.

Figure 6:
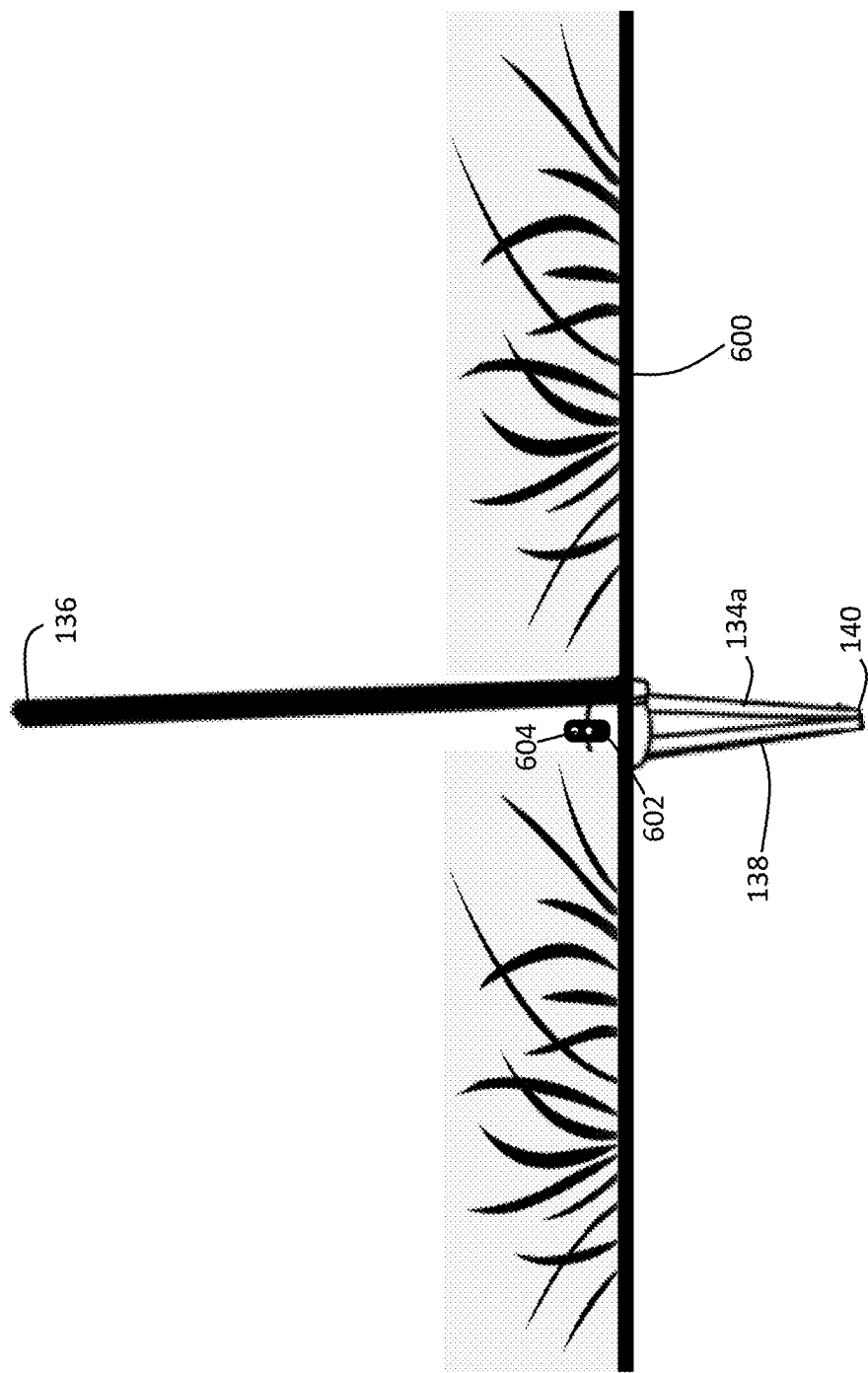
FIG. 6 is perspective view of an exemplary field marker anchored into the surface of a playing field.

The assembly 100 also beneficially includes a plurality of field markers 134a-n. With reference briefly to FIG. 6, one of the plurality of field markers 134a-n is shown anchored into the ground surface 600. A portion of a measuring tape 148 (as shown in FIG. 13) may be disposed adjacent to the plurality of field markers 134a-n after installation. The measuring tape 148 may be extend to a desired length or pattern to ascertain where the plurality of field markers 134a-n are to be discharged from the injection body 104 and anchored to the ground surface.

Figure 7:
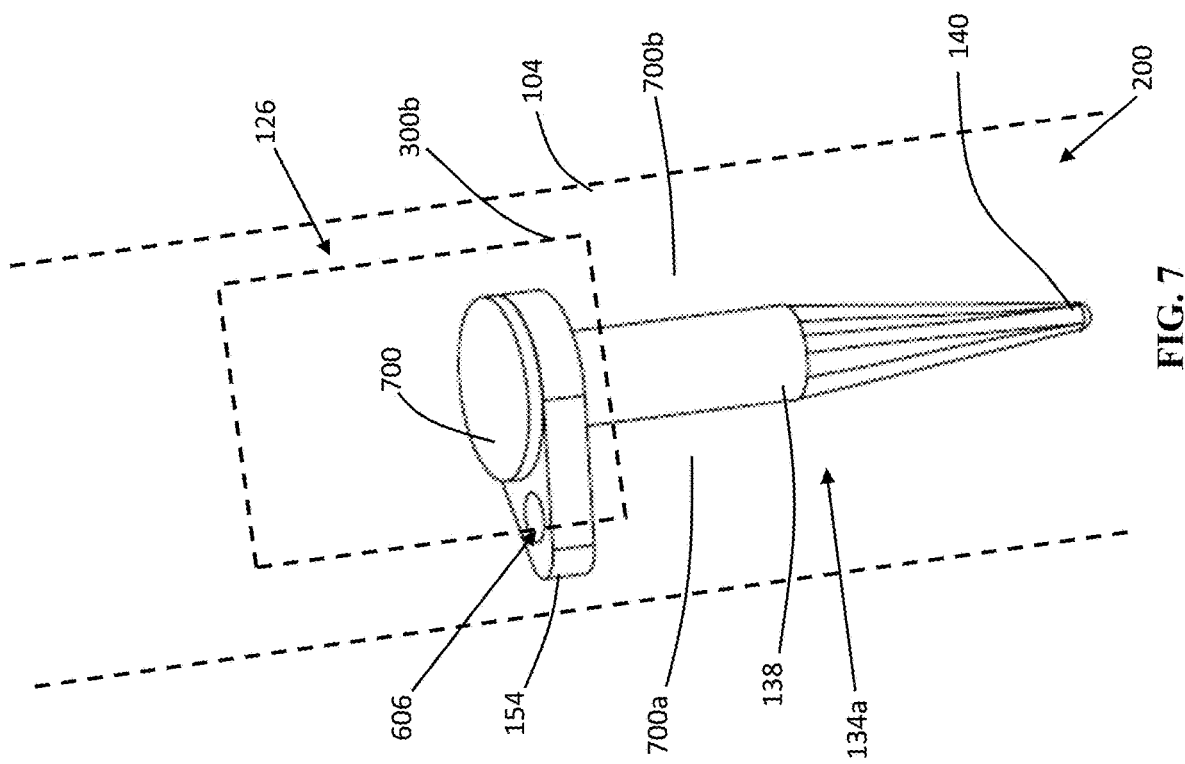
FIG. 7 is perspective view of an alignment marker with a tab rotatably coupled thereto in accordance with one embodiment of the present invention.

Referring now to FIGS. 6-7, the field markers 134a-n or alignment field marker 700 comprise a marker body 138 that defines an insertion tip 140 that is preferably in a tapered configuration. The field markers 134a-n also carry one or more bristles 136a-n thereon. The marker body 138 and/or one of the plurality of bristles 136a, 136b, 136n are operably configured to be inserted (at least partially or fully) within the marker insertion aperture 110 for injection into the surface 600 (as discussed herein). Although field markers 136a, 136n may be inserted into the ground manually, in the preferred embodiment, a user beneficially utilizes the marker anchoring device in order to insert markers into the ground surface 600 and ground.

Taking field marker 134a as an example, the marker anchoring device is operably configured so that the field marker 134a is forced out from the marker discharge opening 112 at the distal end of the injection body 104. In one exemplary method of use, a user will begin by inserting at least one of the plurality of markers into the opening and/or opening. In other embodiments, a user may insert at least one of the plurality of markers in through the magazine mount 116.

When inserting a marker, the handle 106 is in a cocked position along a handle translation path, preferably biased by a spring 114. Still taking one of field markers as an example, upon insertion of field marker 134, a user grasps the handle 106, using one or more gripping portions disposed thereon, and face the distal end of the injection body 104 towards the surface 600. Then a user may apply a downward force (e.g., 2-10 lbf) toward the surface 600 on the handle 106. In alternative embodiments, the assembly 100 utilizes a spring-loaded configuration, whereby the user will activate a lever or switch to place the spring 114 and piston 126 (operably coupled thereto) in a dynamic position to force the marker into the surface 600, thereby placing the piston 126 into an un-cocked position along the handle translation path.

Continuing further, the marker anchoring device 102 urges the field marker out from the marker discharge opening 112 of the injection body 104. The marker anchoring device 102 is operably configured to insert the field markers 134a-n into the surface 600. In some embodiments, a user may manually reset the installer arm back to its original starting position by pulling the handle 106 in the direction of first side end. However, in other embodiments, the piston 126 may include a spring-loaded arm (not shown).

The spring-loaded arm would recoil automatically to its original starting position once a user stops exerting a downward force on the handle 106. In another embodiment, the marker anchoring device 102 may instead include a trigger system (not shown) operably configured to generate a spring force when a user pulls the trigger. The spring force would push one of the plurality of markers out from the piston 126. In another embodiment, the handle 106 may be collapsible, allowing for ease of transportation.

The field marker 134a, 700 may include the body 138 and a tip that are beneficially of a substantially rigid material (e.g., wood), a metallic material (e.g., stainless steel, aluminum), a polymeric material (e.g., PVC, acrylic), or other substantially rigid material that is operable to be inserted into a ground surface 600, e.g., dirt. The marker body 138 of the alignment field marker 700 comprises a tab 154 that defines a tab opening 606. The tab opening 606 is sized to retain a measuring tape 148 for extending along a desired playing field pattern 1300. In some embodiments, there are no bristles when tab 154 is utilized, but in other embodiments bristles may be utilized.

Moreover, the marker body includes a bottom end and an upper end opposing the bottom end. The body is operably configured to maintain the field marker in a firm and stable position in the ground which is uneasily dislodged. Said another way, the body anchors field marker in its position in the ground, wherein the tip is tapered to enable effective penetration of the ground surface 600.

The bottom end of the insertion tip may be inserted in the ground to a certain depth, depending on the height of the body of field marker. The field marker 134a also beneficially includes a plurality of bristles, where "n" represents any number greater than one, coupled to the upper end of the marker body. Notably, the plurality of bristles is disposed on only a portion of the upper end of the body, leaving a space separating the location or joint where the bristles are attached to the body and the upper end thereon.

As seen best in FIG. 7 and FIG. 13, an alignment field marker 700 may be utilized to set up the field marking system and/or begin the field marking installation method. In one exemplary method of use of the assembly the alignment field marker 700 or the field markers 134a-n may be disposed within the translation channel 900 (shown best in FIG. 9) for contact with the piston 126. Alternatively, the alignment field marker 700 or the field markers 134*a-n* may be manually inserted into the ground surface 600 (depicted in FIG. 6). The length 800 of the alignment field marker 700 or the field markers 134*a-n* may be approximately 1-3 inches but may be outside of said range based on design constrains or applications. The length 800 of the marker body 138 for the alignment field marker 700 or the field markers 134*a-n* may be long enough resist approximately 1-4 ft.-lb. of torque. Notably, the one or more bristles 136 on each of the field markers 134*a-n* would be located on the side or underneath of the piston 126 and/or within the handle translation channel 900 when the field marker 134*a* is loaded into the injection body 104. Said another way, the field markers 134*a-n* are operably configured to be placed in an insertion position (shown best in FIG. 1) along a marker translation path with the insertion tip 140 disposed proximal to the distal end 108*a* of the injection body and the head disposed in the translation channel and configured for contact by the piston of the handle Thus, when field marker 134*a* is inserted into the surface 600, the bristles 136*a-n* are the only visible component sticking out of, or, perpendicular to the ground. The bristles 136*a-n* may be of a semi-rigid material (e.g., acrylic, rubber, nylon, polypropylene with a Shore D hardness of approximately 20-60) beneficially operably configured to rotate or flex at acute angle rotations, as exhibited by angle α, when an external force is exerted on the bristles 136*a-n* of the field marker, such as a sports ball or a player's foot. Said another way, the bristles 136*a-n* each individually have the capacity to bend over and rotate back into an upright position when, for example, a user steps on or a sports ball rolls over the bristles 136*a-n*. Moreover, the bristles 136*a-n* are designed not to disturb the trajectory of the sports ball when it comes into contact with the field marker.

In some embodiments, the bristles 136*a-n* of the field markers 134*a-n* are each individually beneficially capable of rotation along the bristle rotation path (represented in an exemplary path with lines). In one embodiment, the bristle rotation path is circular. However, the bristle rotation path may also be of another shape or follow another path. As such, the bristles 136*a-n* may rest in a static position, wherein the bristles 136*a-n* are substantially perpendicular to the ground surface 600. Additionally, when an external force is exerted on the bristles 136*a-n* of the field marker, such as a sports ball or a player's foot, the bristles 136*a-n* are operably configured to rotate along the bristle rotation path to a dynamic position wherein the bristles 136*a-n* lay parallel to the surface 600.

The bristles 136*a-n* are useful for visually indicating the distance between field markers 134*a-n*, and the pattern 1300 formed by the field markers. In an alternative embodiment, a laser device 150 couples to the injection body 104. The laser device 150 is operable to emit a laser beam towards the plurality of field markers 134*a-n*. In this manner, the distance between field markers 134*a-n* anchored into the surface 600 can be accurately determined. However, it is significant to note that laser device 150 may be operably coupled to any section of assembly 100 in order to effectively emit the laser beam. In another alternative embodiment, the plurality of field markers 134*a-n* include a light emitting diode 604 (LED) that is operably configured to illuminate. This illumination helps visually identify the location of the field markers 134*a-n*, and also gives an ornamental effect to the path between field markers 134*a*, 134*n*. In further embodiments of the present invention, as depicted in FIG. 6, the plurality of field markers 134*a-n* may also each include a motion sensor 604 and a transducer (e.g., an LED 604, a speaker, etc.) coupled thereto. The transducer 604 may be operably configured to emit at least one of an audio and visual cue (e.g., a flash of light or sound) upon detection of a motion within a radius thereof (e.g., within 2-3 feet). In one embodiment, the transducer 604 and motion sensor 602 may be coupled directly to the head of the body 138. In another embodiment, the transducer 604 and motion sensor 602 may be coupled to the flexible bristles 136. In another embodiment, the plurality of field markers 134*a-n* may include a controller and network card operably configured to communicate wirelessly with other electronic devices (e.g., multiple field markers 134*a-n*). The plurality of field markers 134*a-n* may be programmed to individually or jointly communicate and emit the cue when a motion is detected within a programmable or set radius. In one embodiment, the plurality of field markers 134*a-n* may be programmed with a software application resident on a user's electronic device, e.g., cellphone.

The assembly 100 comprises a plurality of field markers 134*a-n* (only field marker 134*a* is shown), where "n" represents any number greater than one. The single bristle functions substantially the same as the bristles 136*a-n* of markers. As shown in FIG. 8A, the alignment marker 700 may include a measuring tape 822 coupled to the tab thereto, wherein the tab can rotate 360° thereon. In other embodiments, each of the plurality of markers includes a retractable insertion body 804, including a bottom end 806*a* and an upper end 806*b* opposing the bottom end. The retractable insertion body 804 has a length 802, extending from the bottom end 806*a* to the upper end 806*b*. A tab 818 at the upper end 806*b* forms a tab opening 820 that retains the measuring tape 822, thereby enabling movement wherever the injection body 104 goes.

Moreover, the retractable insertion body 804 includes a fuselage 810. The fuselage 810 operates as a housing cavity which encases a pin 812, as best seen in FIGS. 8A-8B. The pin 812 also has a length, able to fit inside and be enclosed by the housing cavity created by the fuselage 810. As FIG. 8C illustrates, the pin 812, having an upper end 814*b* and a bottom pointed end 814*a*. The pin 812 couples to an end cap 816 on the upper end. Coupled to the end cap 816 are a plurality of spring members that are operable to generate a spring force which forces the end cap 816 up to the top of the upper end 806*b* of the retractable insertion body 804, therefore, the pin 812 is retracted within the fuselage 810. In one exemplary method of use, a user will push the piston 126 downwards, which would in turn push the end cap 816 downwards and force the pin 812 into the surface 600. When the field marker 800 is removed from the surface 600, the pin 812 automatically retracts due to the upward pressure of the springs. Therefore, in one embodiment, the retractable insertion body 804 is operably configured to automatically retract the pin 812 when the field marker 800 is removed from the surface 600. FIG. 8A displays the alignment field marker 800 in a deactivated position, wherein the bottom pointed end 814*a* of pin 812 is retracted. FIG. 8B displays the field marker 800 in an activated position, wherein the bottom pointed end 814*a* of the pin 812 is emerging from the fuselage 810 of the retractable insertion tip 808.

Figure 10:
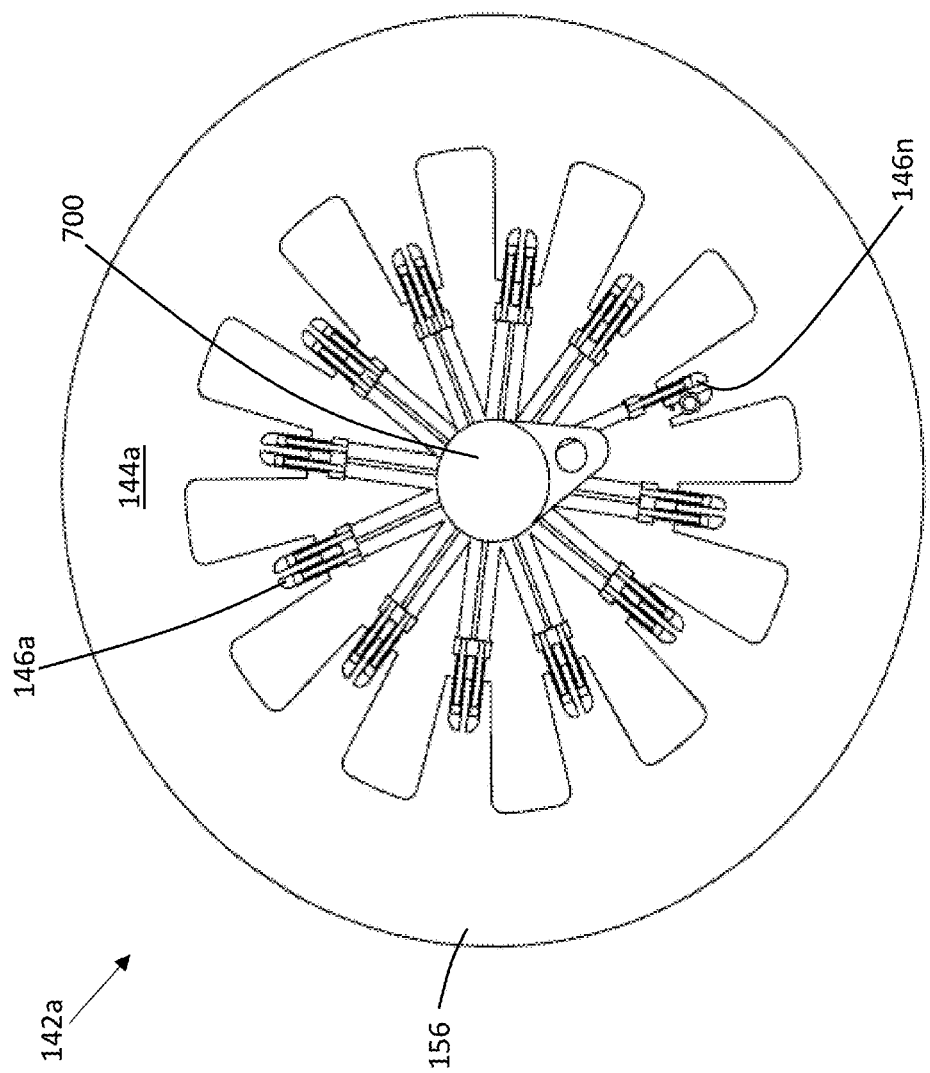
FIG. 10 is top view of an exemplary aligner with one alignment post raised upright, in accordance with the present invention.

FIG. 10 shows an aligner 142*a* which may be used in combination with the present invention. The assembly 100 may include a plurality of aligners 142*a-n* (not shown), where "n" represents any number greater than one. Aligner 142*a* is operably configured to allow a user to lay out the plurality of field markers 134*a-n* in various standard pattern 1300*s* which are typical for training field sports. In preferred embodiments, the aligner measures approximately 4-10 inches in diameter. As illustrated, FIG. 11A shows a left side view of aligner; and FIG. 11B shows a right-side view of aligner. In one embodiment, one or more aligners each having a bottom face, a top face, a center aperture, a plurality of guide post pairs or posts 146*a-n* operably configured to be disposed within the center aperture and selectively movable to a vertical position with respect to the top face. The guide post pairs define and flank a post channel for guiding the measuring tape therethrough. In one embodiment, each of the guide posts 146*a-n* may move/rotate vertically, individually or jointly as pair, to a desired angle (and lock into place) or may move/rotate horizontally/radially around the aligner to be placed at directed angular increments (e.g., 1° increments).

The aligner comprises an outer disc 156 and a center hub 152, forming a generally flat, circular shape. Additionally, a notch 1200 forms in the aligner is a notch. The notch 1200 is configured to enable the tape to be kept aligned with the tab, the guide posts, and the insertion point of the marker. The aligner also has a top face 144*a* and an opposing bottom face 144*b*. The top face 144*a* includes a plurality of collapsible and moveable guide posts 146*a-n*, where "n" represents any number greater than one.

Figure 12:
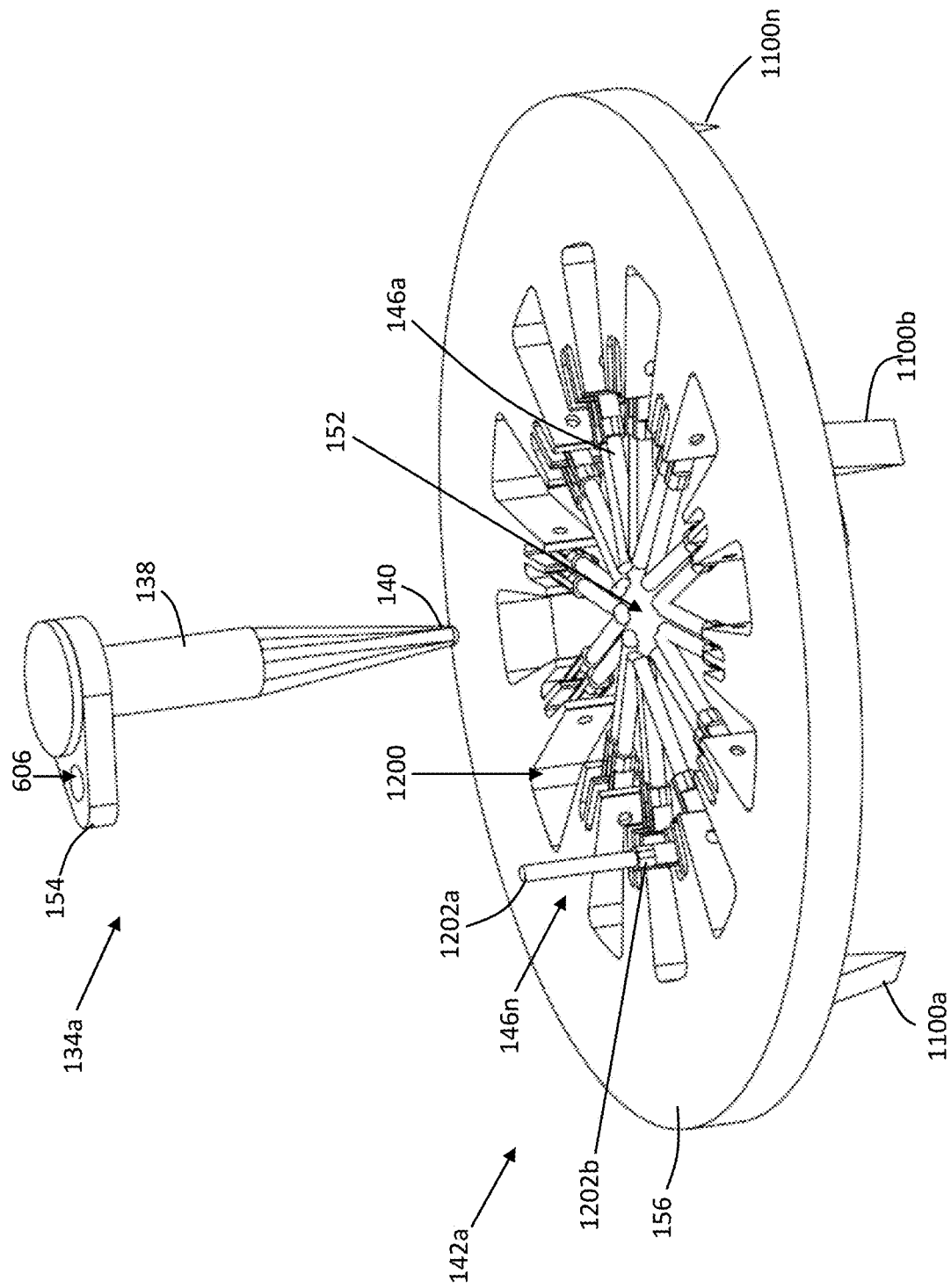
FIG. 12 is a perspective view of an alignment field marker or tool with a tab that centrally aligned with the center hub or center aperture of the aligner for penetration therethrough, in accordance with one embodiment of the present invention.

In one exemplary method of use, a user will choose which of the plurality of collapsible and movable guide posts 146*a-n* he/she wants to use according to the field design that the user is attempting to accomplish. Once the user has chosen, the user will face at least one of the guide posts 146*n* in an upright position. FIG. 12 is perspective view of the field marker aligned with the center hub 152 of the aligner for penetration therethrough. Also illustrated is one goal post 146*n* raised to an upright position in preparation for guiding the measuring tape 148.

It is significant to note that the guide posts can have both, fixed, and adjustable positions. In this manner, the guide posts can be raised for guiding the measuring tape anywhere along an imaginary "clockface". In one possible embodiment, the alignment posts are placed at fixed locations from 1-12 on the "clockface" (30-degree increments); ideally, it would be flexible enough to be adjusted to other increments, (45 degrees, 15 degrees, 10 degrees, etc. to facilitate other layouts desired by the user). As shown below in FIG. 14, a diamond pattern requires the guide posts to be raised at 12 O'clock (1410*a*), 3 O'clock (1410*b*), 6 O'clock (1410*c*), and 9 O'clock (1410*d*) on the aligner 1412.

In some embodiments, the plurality of collapsible and moveable guide posts 146*a-n* has a flexible top section 1202*a* and a rigid bottom section 1202*b*. The upper flexibility allows the measuring tape to urge the guide post away when moving the measuring tape from one guide post to another. In one non-limiting embodiment, the flexible top section 1202*a* is fabricated from silicone or similar material to allow the tape "to go through it" after which the guide post returns to its full vertical position. The measuring tape positions inside the notch 1200, adjacent to the rigid bottom section 1202*b*, in order to facilitate alignment of the measuring tape with the tab and the marker. When the user wishes to move the measuring tape to another guide post, the measuring tape is unhooked from the notch, and moved to an adjacent or opposite guide post, through the flexible top section 1202*a*, for reconfiguring the pattern.

Along the bottom face 144*b* of aligner 142*a*, are a plurality of collapsible spiked feet 1100*a-n*.

Collapsible spiked feet are operably configured to hold and anchor the aligner into the ground. The spiked feet 1100*a-n* are hingedly connected to bottom face 144*b* for pivotal extension to anchor into the surface 600, and easy stowage to a retracted position when not in use. Multiple spiked feet 1100*a-n* may be used. And as shown in FIG. 11A, four feet 1100*a*, 1100*b*, 1100*c*, 1100*n* are utilized, where "n" represents any number greater than one. However, more or a smaller number of spiked feet 1100*a-n* may also be used.

In a further embodiment, FIG. 13 illustrates the assembly 100 in operation, showing the injection body 104 anchoring a plurality of field markers 1302*a-f* into the surface. The injection body 104 receives additional field markers, from magazine mount 116 attached thereto. The attached measuring tape 148 dispenses from tape canister 128, and is extended by the attached field markers 1302*a-f*. As shown, the path followed by measuring tape 148 is guided by the guide posts for two spaced-apart aligners 1310*a*, 1310*b* to form a pattern 1300. As shown, the measuring tape 148 attaches to the tab 1304*a*, 1304*b* of field markers 1302*a*, 1302*f* at the aligners 1310*a-b*. The measuring tape 148 also attaches to the field markers 1302*b*, 1302*c*, 1302*d*, 1302*e* between the aligners 1310*a-b*. The measuring tape 148 may utilize different colors to indicate to a user different standard distance measurement, such as, for example, 1 yard, 5 yards, etc. However, in some embodiments, one or more bristles 1306*a-n* extend from field markers to provide additional visual aid.

In other embodiments, the measuring tape 148 could include measurement marks or other indicia (not shown) delineated in feet or centimeters. In a preferred embodiment, the measuring tape 148 would be approximately 100 feet; however, those of skill in the art will appreciate any appropriate length may be employed. The measuring tape 148 also beneficially includes an eye, coupled to one of its ends and shaped as a circle, which enables the measuring tape 148 to loop over at least one of the plurality of field markers 134*a-n*. In other embodiments, the measuring tape 148 could instead include a pressure clasp (not shown) designed to give way when tugged on by a user.

In a further embodiment, as shown back in FIG. 1, the assembly 100 may also include a tape canister 128. The tape canister 128 contains an interior cavity 132, sized to fit the measuring tape 148 (not shown). In some embodiments, the tape canister 128 also includes retractable wheels. Moreover, the tape canister 128 includes an opening 130 which is connected to the interior cavity 132. The tape canister 128 is operably configured to disperse the measuring tape 148 from the interior cavity 132 through the opening 130 and retract the measuring tape 148 back into the interior cavity 132 by utilizing the retractable wheels.

Figure 14:
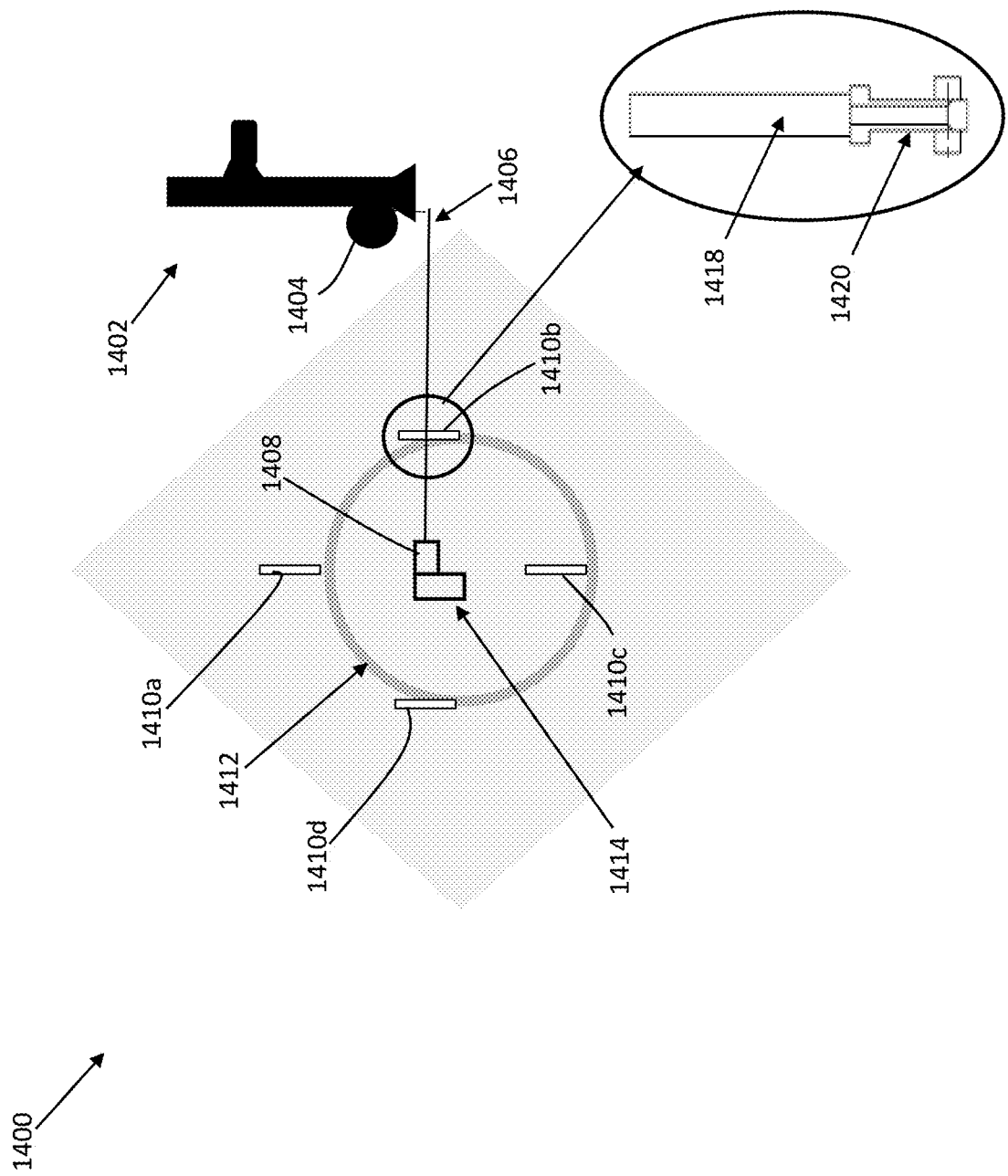
FIG. 14 is diagram view of an exemplary diamond shaped pattern created by inserting a field marker at each corner of the diamond, at the distances desired by the user as indicated on the measuring tape; each marker is inserted once the tab is aligned with the appropriate alignment post, in accordance with the present invention.

As discussed above, the measuring tape 148 follows the path of the field markers form, and receives guidance from the positioning of the guide post on the aligners. This allows assembly 100 to form a desired pattern that marks boundaries and lines across the surface 600 of the playing field. One such exemplary pattern, illustrated in diagram of FIG. 14, is a diamond pattern 1400. Those skilled in the art will recognize that a diamond shaped pattern 1400 may be useful for a baseball field. However, other shapes and dimensions may also be constructed in similar fashion.

To construct the diamond pattern 1400, initially an aligner 1412 is centrally placed inside a diamond shaped outline. The field marker, including a tab for guiding the measuring tape 1406 is positioned in the center of the aligner 1412. The injection body 1402 dispenses a measuring tape 1406 through a tape canister 1404. The measuring tape 1406 attaches to a tab 1408 on the field marker 1414. The aligner 1412, having multiple guide posts, rests centrally in relation thereto. Four guide posts are raised to an upright position for guiding the measuring tape 1406. The guide posts are raised at 12 O'clock (1410*a*), 3 O'clock (1410*b*), 6 O'clock (1410*c*), and 9 O'clock (1410*d*) on the aligner 1412. This forms the desired diamond shape markings.

It is significant to note that for the user to install the third marker at the third guide post 1410*c*, the measuring tape 1406 would have to be able to be moved out of the notch in the second guide post 1410*b* before the user could go to the left, or towards the third guide post 1410*c*. This is why the top part, e.g., portion 1418, of the guide post 1410*a-d* has to be flexible, so that the tape can be moved across it to other alignment posts. The notch, e.g., notch 1420, in the aligner is there to keep the measuring tape stable and to align it with the tab at the center of the aligner.

Figure 15:
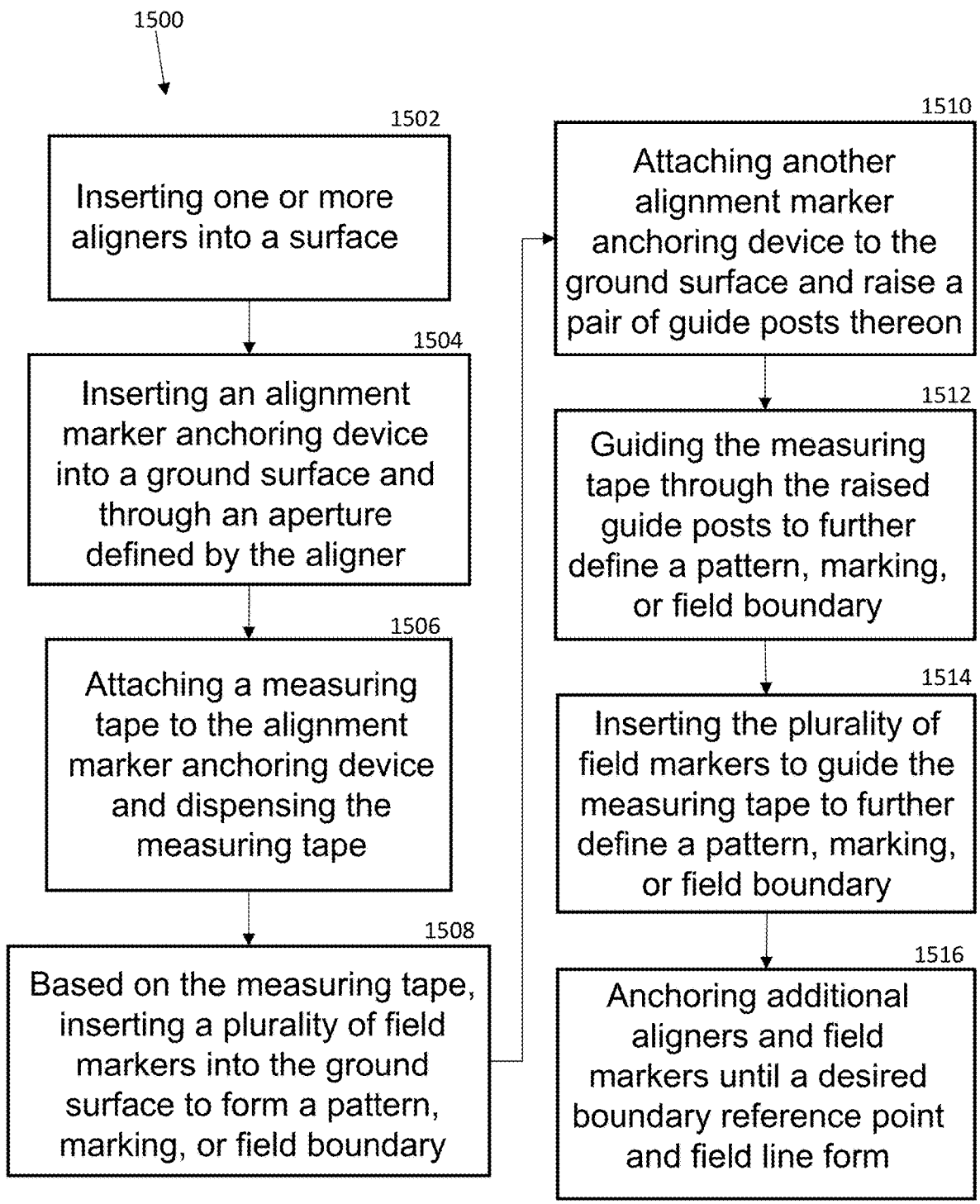
FIG. 15 is flowchart of an exemplary method for marking a field with a playing field marking assembly, in accordance with the present invention.

FIG. 15 references a flowchart for a method 1500 of marking a field with a sports field marking assembly. The method 1500 is configured to operate the marker anchoring device while coupled to both the magazine mount and the tape canister 128, along with the measuring tape and the plurality of aligners, so as to insert the plurality of field markers into the surface in a desired pattern. A user will use the assembly 100 while it is removably coupled to both the magazine and the tape canister, along with the measuring tape and the plurality of aligners, in order to insert the plurality of markers into the ground in a desired pattern.

The method 1500 comprises an initial Step 1502 of inserting a one or more aligners into the surface. First, the user will insert the first aligner into the ground, then the user will use assembly 100 to insert field marker into the middle of the first aligner and into the ground. The method 1500 may also include a Step 1504 of inserting, with the marker anchoring device, a first field marker into the middle of the first aligner and into the surface. Another Step 1506 comprises dispensing a measuring tape from a tape canister, the measuring tape coupled to a tab on the field markers. A Step 1508 includes inserting, with the marker anchoring device, one or more subsequent field markers into the surface, whereby the measuring tape extending between multiple field markers forms a pattern. The method 1500 may further comprise a Step 1510 of selectively raising at least one guide posts on the aligners to an upright position.

In some embodiments, a Step 1512 comprises guiding the extended measuring tape through the raised guide posts, whereby the measuring tape extends along the pattern formed by the field markers. A Step 1514 includes coupling the measuring tape around subsequently anchored field markers while continuing to install the field markers across the surface. A final Step 1516 includes anchoring additional aligners and field markers until a desired boundary reference point and field line form.

In another exemplary method of marking, a user will use the assembly 100 while it is removably coupled to both the magazine and the tape canister, along with the measuring tape and the plurality of aligners, in order to insert the plurality of markers into the ground in a desired pattern. First, the user will insert the first aligner into the ground, then the user will use assembly 100 to insert field marker into the middle of the first aligner and into the ground. Then the user will decide which of the plurality of collapsible and movable guide posts he/she wants to use according to the field design that the user is attempting to accomplish. Once the user has chosen, the user will face at least two of the guide posts on the first aligner in an upright position in order to guide the measuring tape though the chosen guide posts. Said another way, the measuring tape will be guided through the guide posts on aligners. The user will loop the eye of measuring tape around the field marker and continue to install the plurality of markers throughout the field. Thereafter, the user may repeat the foregoing steps until the desired field design is accomplished. In another embodiment of the present invention, one or more of the plurality of aligners may include a housing for a retractable and extendable tape. This would have several advantages, including giving the user an easier path to more complex layouts. To effectuate or embody said feature, the assembly 100 would be modified to allow the aligner's tape to be attached to the housing of said installer. Additionally, one or more of the aligners would also be modified to accommodate the tape and allow the user to position the tape to be released in any direction desired by the user.

Although a specific order of utilizing the sports field marking assembly and method of marking a field has been described, the order of executing the steps may be changed relative to the order shown in certain embodiments. Also, two or more steps may be executed concurrently or with partial concurrence in some embodiments. Certain steps may also be omitted for the sake of brevity. In some embodiments, some or all of the process steps may be combined into a single process.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

What is claimed is:

1. A sports field marking assembly comprising:
a marker anchoring device having an injection body with a proximal end, with a distal end, a translation channel spanning from the proximal end of the injection body to the distal end of the injection body, defining a marker insertion aperture, and defining a marker discharge opening thereon spatially coupled to the marker insertion aperture and the translation channel, having a handle translatably coupled to the injection body and with a piston disposed within and operably configured to slide within the translation channel;
a plurality of field markers each having a marker body defining an insertion tip of a tapered configuration, configured to be inserted within the marker insertion aperture, operably configured to be discharged through the marker discharge opening, with a head, and having at least one cantilevered flexible bristle extending from the marker body, the plurality of field markers having an insertion position along a marker translation path with the insertion tip disposed proximal to the distal end of the injection body and the head disposed in the translation channel and configured for contact by the piston of the handle;
a tape canister coupled to the injection body and disposed proximal to the distal end of the injection body, the tape canister having a measuring tape disposed therein and operably configured to extend and retract with respect to the tape canister;
an alignment field marker having a tab rotatably coupled to the alignment field marker and operably configured to rotate 360° thereon, the tab defining a tab opening configured to receive the measuring tape;
a plurality of aligners each having a bottom face, a top face, a center aperture, a plurality of guide post pairs operably configured to be disposed within the center aperture and selectively movable to a vertical position with respect to the top face.

2. The sports field marking assembly of claim 1, wherein the bottom face of each of the plurality of aligners comprises multiple collapsible spiked feet operably configured to anchor the aligner to the surface.

3. The sports field marking assembly of claim 1, wherein the plurality of guide post pairs define and flank a post channel for guiding the measuring tape.

4. The sports field marking assembly of claim 1, wherein the marker anchoring device further comprises:
a spring coupled to the piston and operably configured to bias the handle away from the proximal end of the injection body; and
the at least one cantilevered flexible bristle extending through the marker insertion aperture when one of the plurality of field markers is disposed in the insertion position along the marker translation path.

5. The sports field marking assembly of claim 1, wherein the plurality of field markers each further comprise:
a motion sensor and a transducer coupled thereto, the transducer operably configured to emit at least one of an audio and visual cue upon detection of a motion within a radius thereof.

6. The sports field marking assembly of claim 1, further comprising a magazine mount operably configured to guide the plurality of field markers into the injection body, the plurality of field markers disposed in a serially aligned configuration and each having at least one LED coupled thereto.

7. The sports field marking assembly of claim 6, wherein the magazine mount comprises a marker housing operably configured to hold the field markers, the marker housing having an upper end and a bottom end opposing the upper end, the upper end being removably coupled to the distal end of the injection body, and in alignment with the marker insertion aperture.

8. The sports field marking assembly of claim 1, further comprising at least one of a laser device and a sonar device coupled to the injection body, the at least one of the laser device and the sonar device operably configured to emit a laser or a sonar, respectively, towards the plurality of field markers, whereby the distance between field markers is determined.

9. The sports field marking assembly of claim 1, wherein the injection body comprises a plurality of retractable stabilizers.

10. The sports field marking assembly of claim 1, wherein the plurality of field markers comprises a retractable insertion body, having a bottom end and an upper end opposing the bottom end, the retractable insertion body further having a length, extending from the bottom end to the upper end of the retractable insertion body.

11. The sports field marking assembly of claim 10, further comprising a plurality of bristles coupled to the marker body.

12. The sports field marking assembly of claim 11, wherein the retractable insertion body comprises a fuselage, the fuselage encasing a pin having a length.

13. The sports field marking assembly of claim 12, wherein the pin comprises a dart having an upper end and a bottom pointed end, the dart being coupled to an end cap on the upper end.

14. The sports field marking assembly of claim 13, wherein the end cap couples to a plurality of spring members operably configured to generate a spring force that forces the end cap up to the top of the upper end of the retractable insertion body, whereby the pin is retracted within the fuselage.

15. The sports field marking assembly of claim 1, wherein the measuring tape comprises an eye coupled to one of the ends of the measuring tape, the eye defining a circular shape and being operably configured to loop over at least one of the plurality of field markers, the tape canister further defining an interior cavity sized to fit the measuring tape, the tape canister further defining an opening in fluid communication with the interior cavity.

16. The sports field marking assembly of claim 1, wherein the surface comprises a sports field, and the pattern comprises a boundary reference point and a field line on the sports field.

17. The sports field marking assembly of claim 3, wherein the plurality of collapsible and moveable guide posts have a flexible top section and a rigid bottom section.

18. A sports field marking assembly, the assembly comprising:
a marker anchoring device comprising an injection body having a distal end and a proximal end, the injection body comprising a plurality of retractable stabilizers, the distal end defining a marker insertion aperture and a marker discharge opening thereon, the proximal end including a translatable handle defining a handle translation channel spanning from a portion of the injection body to the marker discharge opening, the handle having a piston disposed and operably configured to slidably translate within the handle translation channel, the piston comprising a spring operably configured to slidably translate within the handle translation channel;
a plurality of field markers, each having a marker body having a tab, the tab forming a tab opening, the marker body further defining an insertion tip and having a plurality of bristles coupled to the marker body, the marker body and the plurality of bristles operably configured to be inserted within the marker insertion aperture, the marker body and the plurality of bristles further being operably configured to be discharged through the marker discharge opening, whereby the plurality of field markers is operable to anchor into a surface of a sports field in a pattern, the pattern defining a boundary reference point and a field line;
a tape canister coupled to the injection body, the tape canister operable to dispense a measuring tape, the measuring tape being detachably coupled to the field markers, whereby the measuring tape extends along the pattern formed by the field markers;
a plurality of aligners having a bottom face, a top face, an outer disc, a center hub, and defining a notch, the bottom face comprising multiple collapsible spiked feet operably configured to anchor the aligner to the surface, the top face comprising a plurality of collapsible and moveable guide posts operatively configured to be selectively lowered and raised, whereby the guide posts in the raised position guide the measuring tape along the pattern; and
a magazine mount operably configured to guide the plurality of field markers into the marker insertion aperture of the injection body, the magazine mount magazine comprising a marker housing operably configured to hold the field markers, the marker housing having an upper end and a bottom end opposing the upper end, the upper end being removably coupled to the distal end of the injection body, and in alignment with the marker insertion aperture.

19. A method of operating a sports field marking assembly, the method comprising:
- inserting a one or more aligners into a surface;
- inserting, with a marker anchoring device, a first field marker into the middle of the first aligner and into the surface;
- dispensing a measuring tape from a tape canister, the measuring tape coupled to a tab on the field markers;
- inserting, with the marker anchoring device, one or more subsequent field markers into the surface, whereby the measuring tape extending between multiple field markers forms a pattern;
- selectively raising at least one guide posts on the aligners to an upright position;
- guiding the extended measuring tape through the raised guide posts, whereby the measuring tape extends along the pattern formed by the field markers;
- coupling the measuring tape around subsequently anchored field markers while continuing to install the field markers across the surface; and
- anchoring additional aligners and field markers until a desired boundary reference point and field line form.

\* \* \* \* \*